(12) United States Patent
Okada et al.

(10) Patent No.: US 6,739,995 B2
(45) Date of Patent: May 25, 2004

(54) PUSHING BLOCK FOR CVT BELT AND MANUFACTURING METHOD THEREFOR

(75) Inventors: Yoshinari Okada, Wako (JP); Haruo Fukuda, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 10 days.

(21) Appl. No.: 10/074,254

(22) Filed: Feb. 14, 2002

(65) Prior Publication Data

US 2002/0160870 A1 Oct. 31, 2002

(30) Foreign Application Priority Data

Feb. 16, 2001 (JP) .......................................... 2001-040871

(51) Int. Cl.[7] ................................................. F16G 1/22
(52) U.S. Cl. ........................................ 474/242; 474/201
(58) Field of Search .............................. 474/201, 242; 148/559, 575, 578, 579, 614

(56) References Cited

U.S. PATENT DOCUMENTS

| 4,448,613 | A | * | 5/1984 | Sherby et al. | ............... | 148/612 |
| 4,604,145 | A | * | 8/1986 | Kanabara et al. | ........... | 148/598 |
| 5,169,369 | A | * | 12/1992 | Masuda et al. | ............. | 474/242 |
| 5,445,685 | A | * | 8/1995 | Strum et al. | ................ | 148/324 |

OTHER PUBLICATIONS

Patent Abstracts of Japan, vol. 013, No. 293 (C–615), Jul. 6, 1989 & JP 01–087748, Mar. 31, 1989.

* cited by examiner

*Primary Examiner*—David A. Bucci
*Assistant Examiner*—Vicky Johnson
(74) *Attorney, Agent, or Firm*—Arent Fox PLLC

(57) ABSTRACT

A pushing block for the CVT belt has a hyper-eutectoid structure overall and exhibiting a structure in which spheroidal cementite having an area percentage of 0.4% or more are dispersed in a matrix of a martensite.

3 Claims, 4 Drawing Sheets

PUSHING BLOCK FOR CVT BELT AND MANUFACTURING METHOD THEREFOR

BACKGROUND OF THE INVENTION

1. Technical Field

The present invention relates to a pushing block for a continuously variable transmission (CVT) belt and to a manufacturing method for the same, and more particularly, the present invention relates to a technique which can increase toughness in addition to hardness and can improve durability.

2. Related Art

A CVT belt is formed by continuously connecting a plurality of pushing blocks by a steel belt so as to form a circular shape, and as the pushing block, there has been provided a structure in which a hyper-eutectoid steel such as a material corresponding to SKS95 or the like is spheroidized and annealed and is thereafter formed, quenched, and tempered. At the time of quenching, a treatment is performed maintaining a temperature equal to or greater than an austenitizing temperature (about 750° C.) for fifteen minutes or more, and in an actual operation, a maintaining time for thirty minutes to sixty minutes is typical.

A material structure of the pushing block manufactured in the manner described above demonstrates a martensitic structure having a non-dissolved carbide having an area percentage of about 0.4%.

However, since a heat treatment of the conventional CVT pushing block is performed mainly for the purpose of increasing hardness in order to ensure wear resistance, impact strength is low while hardness is about HRC60, and impact value (a Charpy U notch) is only about 20 J/cm².

However, since the pushing block of the CVT belt requires toughness in addition to hardness due to being subjected to impacts, it is a problem to improve the impact strength of the pushing block for ensuring the durability at a time of making the CVT compact and applying the CVT to a high torque engine.

Accordingly, an object of the present invention is to provide a pushing block for a CVT belt which is provided with a sufficient toughness in addition to hardness and is superior in wear resistance and durability, and to provide a manufacturing method for the same.

SUMMARY OF THE INVENTION

The pushing block for the CVT belt (hereinafter referred to as a "pushing block") in accordance with the present invention is characterized by having a hyper-eutectoid structure overall and exhibiting a structure in which spheroidal cementite having an area percentage of 0.4% or more are dispersed in a matrix of a martensite.

In accordance with the pushing block having the structure described above, since the matrix is the martensite, a high surface hardness is provided, and since carbon is fixed to the spheroidal cementite and a concentration of the carbon in the matrix is low, toughness is improved. In this case, the effect improving toughness can be obtained when the area percentage of the spheroidal cementite in the structure is equal to or greater than 0.4%. Accordingly, in the pushing block in accordance with the present invention, it is possible to improve the durability in addition to the wear resistance. It should be noted that the area percentage of the spheroidal cementite in the structure is preferably equal to or greater than 1%, so that the impact strength is stable.

Furthermore, in accordance with the present invention, there is provided a manufacturing method for a pushing block comprising the steps of: performing a spheroidizing annealing to a hyper-eutectoid steel; and thereafter performing a quenching and a tempering, wherein the time for maintaining the pushing block at a temperature equal to or greater than an austenizing temperature in a heating operation for the quenching is set in a range of 5 to 40 minutes.

In accordance with the manufacturing method described above, it is possible to obtain a structure in which a spheroidal cementite is dispersed in a matrix of a ferrite due to the spheroidizing annealing. Carbon in the spheroidal cementite is dissolved in the austenite by heating and maintaining it at a high temperature. The manufacturing method in accordance with the present invention is characterized in that the time for maintaining the pushing block at the temperature equal to or greater than the austenizing temperature in the heating operation for the quenching is in a range of 5 to 40 minutes. In the case in which the time for maintaining the pushing block at a temperature equal to or greater than the austenizing temperature is less than 5 minutes, only a small amount of carbon is dissolved in the austenite, and the martensite is insufficiently generated in the quenching, therefore, it is impossible to obtain a necessary surface hardness. In contrast, in the case in which the time for maintaining the pushing block at the temperature equal to or greater than the austenizing temperature is more than 40 minutes, it is impossible to obtain an effect for improving toughness. It should be noted that the time for maintaining the pushing block at the temperature equal to or greater than the austenizing temperature is preferably not more than 15 minutes since the impact strength is stable.

In general, a normalized structure in a hyper-eutectoid steel consists of a mixed structure of a pearlite and a cementite. In such a structure, an austenitic transformation is quickly promoted, and most of the contained carbon is dissolved in the austenite. In contrast, in the present invention, since the structure consists of a ferrite and a spheroidal cementite, the austenitic transformation causes a diffusion of the carbon contained in the cementite into the austenite, and the diffusion is not quickly promoted, and it is believed that the spheroidal cementite remains in the austenite. However, the explanations above are theoretical, and therefore the present invention is not limited thereby.

BRIEF EXPLANATION OF THE DRAWINGS

at the quenching time and the area percentage of the non-dissolved carbide in accordance with an embodiment of the present invention.

DETAILED DESCRIPTION OF THE INVENTION

Next, a description will be given of an embodiment in accordance with the present invention. A raw material used in a manufacturing method for a pushing block in accordance with the present invention can be obtained by blooming and forging an ingot produced by melting and performing a spheroidizing annealing after a hot rolling. The material after the hot rolling demonstrates a structure in which a cementite is precipitated in a grain boundary of a pearlite matrix in a net shape. By performing the spheroidizing annealing to the material, a structure in which the cementite is dispersed in a ferrite can be obtained. The spheroidizing annealing corresponds, for example, to a treatment in which the material is kept at 720° C. for 12 hours and is thereafter cooled in the furnace. Thereafter, the material is rolled to a predetermined thickness by repeating a cold rolling and a softening annealing, and the pushing block is formed from the cold rolled plate, for example, by a fine blanking.

Next, the pushing block is subjected to a quenching, a tempering, a barrel grinding, a burr removal, and a further barrel grinding, and a product is then produced. It is sufficient that the heating temperature for the quenching is higher than an austenite transformation point, for example, which can be set to 800° C. Furthermore, an oil quenching is applied after heating and maintaining at a temperature equal to or greater than the austenitizing temperature for 5 to 40 minutes. A low temperature tempering is desirable in the tempering thereafter, for example, it is preferable to maintain it at 180° C. for 120 minutes. In this case, the pushing block in accordance with the present invention can employ an optional carbon tool steel such as an SK material, an SKS material and the like as long as it is the hyper-eutectoid steel.

EXAMPLES

A. Manufacturing of Pushing Block

Figure 1:
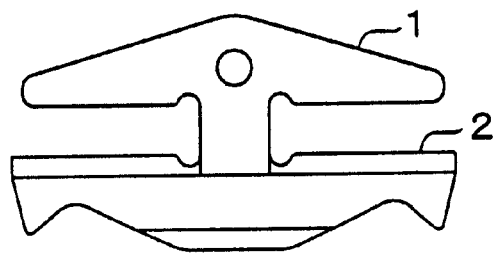
FIG. 1 is a plan view showing a pushing block for a CVT belt corresponding to a subject of the present invention.

A spheroidizing annealing maintained at 720° C. for 12 hours was performed to a hot rolled plate having a chemical composition (weight %) shown in Table 1, and thereafter the plate was cooled in a furnace. The composition shown in Table 1 is a material corresponding to SKS95. A cold rolled plate having a thickness of 1.5 mm was obtained by repeatedly performing a cold rolling and a softening annealing to the material three times. In the softening annealing in this case, a first process was performed at 710° C. for 13 hours, a second process was performed at 720° C. for 10 hours and a third process was performed at 720° C. for 7 hours, and the material was cooled in the furnace after the maintaining time had passed. Next, the pushing block shown in FIG. 1 is obtained from the cold rolled material by a fine blanking. Furthermore, the pushing block was heated to 800° C., and an oil quenching was performed after various heating and maintaining time had passed. Next, the tempering for maintaining the pushing block at 180° C. for 120 minutes was performed, and thereafter, the material was removed from the furnace and cooled by air. Among the pushing blocks obtained in accordance with the manufacturing methods described above, the pushing block in which the heating and maintaining time is in a range of 5 to 40 minutes had overall hyper-eutectoid composition, and formed a structure in which the spheroidal cementite is dispersed in the matrix of the martensite.

TABLE 1

| C | Si | Mn | P | S | Cu | Ni | Cr |
|---|----|----|---|---|----|----|-----|
| 0.85 | 0.21 | 0.85 | 0.01 | 0.003 | 0.01 | 0.01 | 0.46 |

B. Evaluation of Properties

Figure 2:
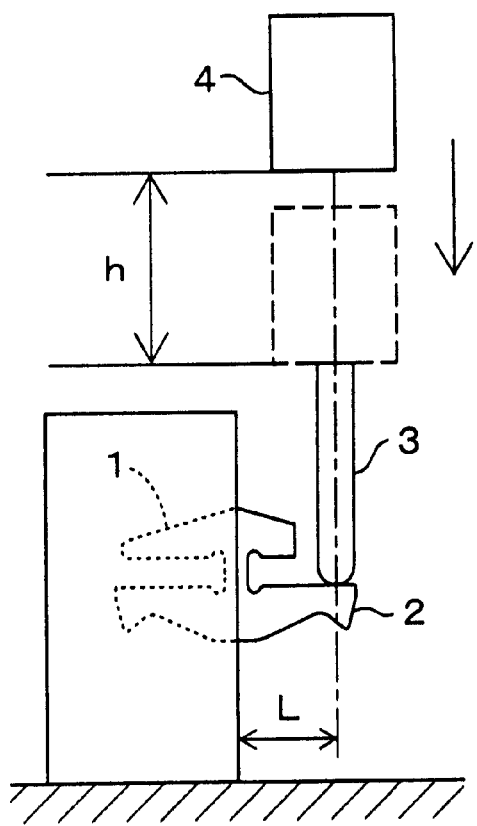
FIG. 2 is a side view showing a state in which a pushing block is mounted to a jig for an impact test.

An impact test was performed with respect to the pushing block manufactured in the manner described above. During actual use, since upper arm portions 1 of the pushing blocks disposed adjacent to each other are abraded and collided with each other, they are easily broken. However, since it would be fair to say that the impact strength of the pushing block is substantially uniform overall, an impact strength of a leg portion 2 in a lower side of the arm portion 1 was measured. FIG. 2 shows a jig for mounting the pushing block in the impact test. The pushing block in which one of the arm portion 1 is cut out is mounted to the jig, and a weight 4 is dropped down on a pin 3 mounted on the leg portion 1. In this case, a distance L between a center of the pushing block and an impact position is set to 11 mm.

Figure 3:
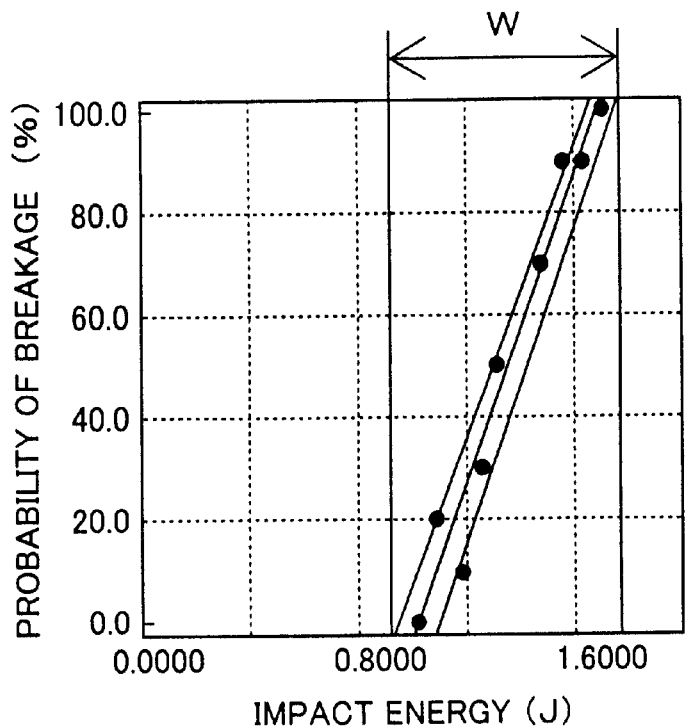
FIG. 3 is a graph showing the relationship between impact energy and failure probability.

An impact energy E when the weight 4 is collided to the leg portion 2 can be expressed by "mgh" when the mass of the weight 4 is "m", the dropping height is "h" and gravitational acceleration is "g". In the impact test, impact strength is estimated by changing the dropping height h so as to determine the probability of the leg portion 2 braking. FIG. 3 is a view for explaining a principle thereof. As shown in FIG. 3, a critical impact energy by which the material is broken has a dispersion W; however, the larger the impact energy is, the higher the probability of breakage becomes. Accordingly, an impact energy in which the probability of breakage is 95% is estimated as the impact strength.

Figure 4:
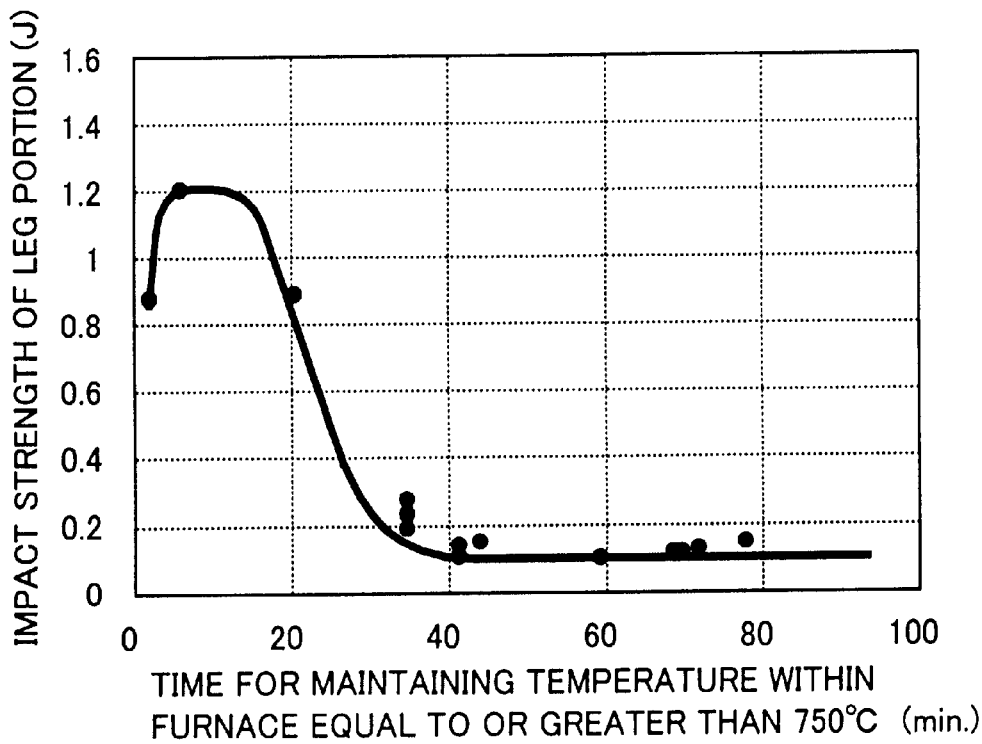
FIG. 4 is a graph showing the relationship between the time for maintaining a pushing block within a furnace having a temperature equal to or greater than 750° C. (being substantially equal to a temperature of the pushing block) at a quenching time and an impact strength in accordance with an embodiment of the present invention.

FIG. 4 is a graph showing the relationship between the time for maintaining the pushing block within the furnace having the temperature equal to or greater than 750° C. (being substantially equal to the temperature of the pushing block) in the quenching and the impact strength of the leg portion. As shown in FIG. 4, when the time for maintaining the pushing block within the furnace is shorter than 40 minutes, the impact strength is increased; it becomes stable when the maintaining time is in a range of 5 to 15 minutes, and when the maintaining time is equal to or less than 5 minutes, the impact strength is reduced.

Figure 5:
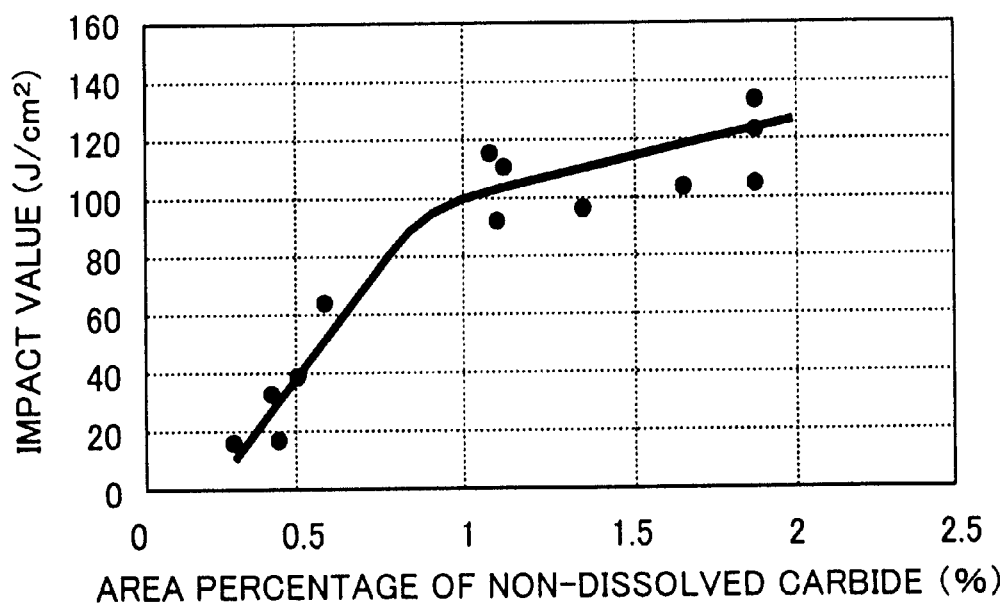
FIG. 5 is a graph showing the relationship between the area percentage of a non-dissolved carbide and an impact value in accordance with the embodiment of the present invention.
Figure 6:
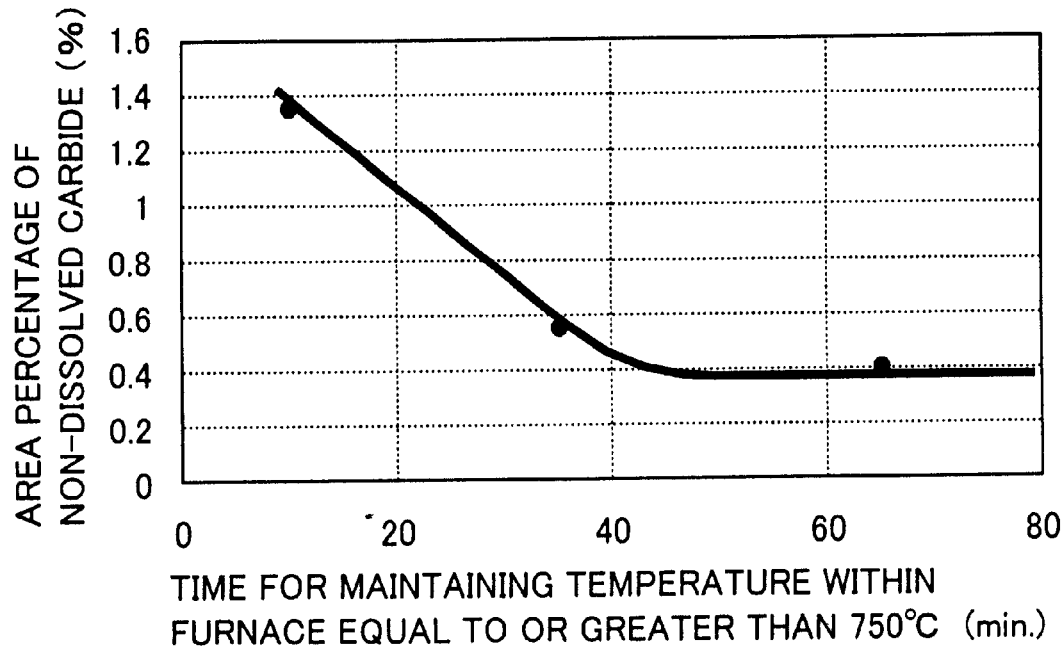
FIG. 6 is a graph showing the relationship between the time for maintaining the pushing block within the furnace having a temperature equal to or greater than 750° C. (being substantially equal to the temperature of the pushing block)

Next, the relationship between a non-dissolved carbide (spheroidal cementite) existing in the structure of the pushing block and the impact value (Charpy U notch) was examined and the result thereof is shown in FIG. 5. As can be seen from FIG. 5, the impact value is improved when the area percentage of the non-dissolved carbide is equal to or greater than 0.4%, and it is substantially stable when it is more than 1%. Furthermore, FIG. 6 is a graph showing the relationship between the maintaining time of the pushing block when the temperature within the furnace in the quenching (being substantially equal to the temperature of the pushing block) is equal to or greater than 750° C., and the area percentage of the non-dissolved carbide. As can be seen from FIG. 6, when the maintaining time is shorter than 40 minutes, the area percentage of the non-dissolved carbide is increased from 0.4%. On the basis of the results mentioned above, it is confirmed that it is sufficient that the maintaining time be equal to or less than 40 minutes.

Figure 7:
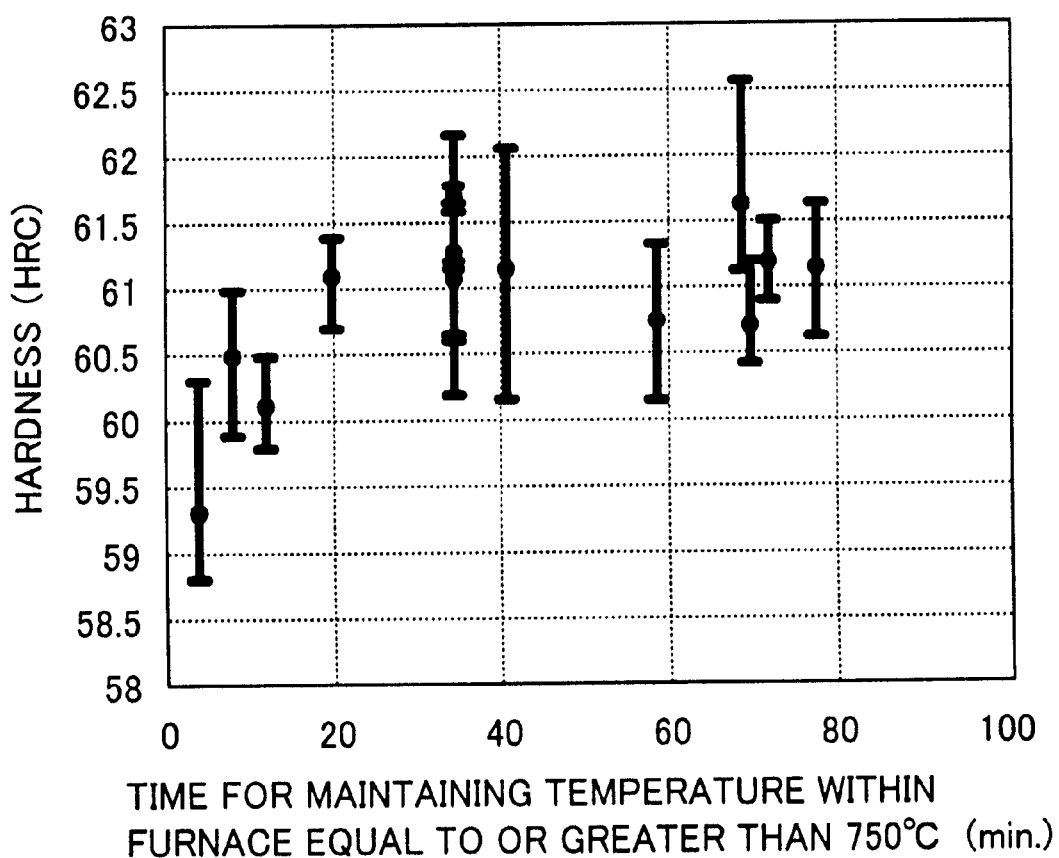
FIG. 7 is a graph showing the relationship between the time for maintaining the pushing block within the furnace having a temperature equal to or greater than 750° C. (being substantially equal to the temperature of the pushing block) at the quenching time and a hardness in accordance with an embodiment of the present invention.

Next, the relationship between the time for maintaining the pushing block within the furnace when the temperature within the furnace in the quenching (being substantially equal to the temperature of the pushing block) is equal to or greater than 750° C.; and the hardness was researched, and the results thereof are shown in FIG. 7. As can be seen from FIG. 7, when the maintaining time is less than 5 minutes, the diffusion of the carbon into the austenite is insufficient, so that it is insufficient to produce martensite, and the hardness is further lowered. In accordance with this result, it was confirmed that the maintaining time requires 5 minutes or more.

What is claimed is:

1. A pushing block for the CVT belt having a hyper-eutectoid structure overall and exhibiting a structure in which spheroidal cementite having an area percentage of 1.0% or more are dispersed in a matrix of a martensite.

2. The pushing block for the CVT belt according to claim 1, wherein the pushing block is produced by the steps of:
   performing a spheroidizing annealing to a hyper-eutectoid steel; and thereafter performing a quenching and a tempering,
   wherein the time for maintaining the pushing block at a temperature equal to or greater than an austenizing temperature in a heating operation for the quenching is set in a range of 5 to 40 minutes.

3. The pushing block for the CVT belt according to claim 1, wherein the pushing block is produced by the steps of:
   performing a spheroidizing annealing to a hyper-eutectoid steel; and thereafter performing a quenching and a tempering,
   wherein the time for maintaining the pushing block at a temperature equal to or greater than an austenizing temperature in a heating operation for the quenching is set in a range of 5 to 15 minutes.

* * * * *